(12) United States Patent
Ragni

(10) Patent No.: US 7,522,338 B2
(45) Date of Patent: Apr. 21, 2009

(54) WINDING PROJECTION SCREEN

(75) Inventor: Matteo Ragni, Milan (IT)

(73) Assignee: Fiam Italia, S.p.A. (IT)

( * ) Notice: Subject to any disclaimer, the term of this patent is extended or adjusted under 35 U.S.C. 154(b) by 0 days.

(21) Appl. No.: 11/716,116

(22) Filed: Mar. 9, 2007

(65) Prior Publication Data
US 2007/0217006 A1 Sep. 20, 2007

(30) Foreign Application Priority Data
Mar. 10, 2006 (IT) .......................... MI2006A0435

(51) Int. Cl.
G03B 21/56 (2006.01)
(52) U.S. Cl. ...................... 359/443; 359/461
(58) Field of Classification Search ................. 359/461, 359/443; 160/239
See application file for complete search history.

(56) References Cited

U.S. PATENT DOCUMENTS

| 4,045,123 A * | 8/1977 | Brown ......................... 359/461 |
| 6,336,616 B1 * | 1/2002 | Lin ............................. 359/461 |
| 7,108,142 B2 | 9/2006 | Kita |
| 7,458,175 B2 * | 12/2008 | Meyer et al. ................. 359/461 |
| 2005/0185273 A1 | 8/2005 | Lee |

FOREIGN PATENT DOCUMENTS

| EP | 1374729 A1 | 1/2004 |
| FR | 2875686 A | 3/2006 |
| JP | 11109516 A | 4/1999 |

* cited by examiner

Primary Examiner—Christopher Mahoney
(74) Attorney, Agent, or Firm—Robert C. Haldiman, Esq.; Husch Blackwell Sanders LLP

(57) ABSTRACT

The winding projection screen comprises a support structure, a winding roller and a projection sheet wound on said roller. The support structure comprises a top horizontal support plane and a vertical engagement face for projecting engagement at a wall. In this way, the support structure for the winding screen itself becomes a furnishing element; it can for example be shaped like a shelf, or else be used as the lower part of a hanging cabinet piece.

21 Claims, 1 Drawing Sheet

WINDING PROJECTION SCREEN

CROSS-REFERENCE TO RELATED APPLICATIONS

This application claims priority to Italian Application No. MI2006A000435 filed on 10 Mar. 2006.

BACKGROUND OF THE INVENTION

1. Field of the Invention

The present invention refers to a winding projection screen.

2. Related Art

SUMMARY OF THE INVENTION

It is known that there is an increasing spread of ever more complex video systems for home use, including video-projection systems. In these systems, the video image (coming from a television receiver, from a computer, from a video-recorder, from a DVD-player or from other video apparatuses) is projected by a video-projector onto a wall or better onto a suitable screen, formed from a sheet having optical characteristics such as to ensure good vision of the projected image.

Both fixed screens, in which the sheet is tightened in a suitable frame that is hung on the wall, and Winding screens, in which the sheet is normally wound on a roller inside a box-shaped housing and support structure, which is fixed to the ceiling, either projecting or built-in, are known.

The fixed screen solution is normally not very popular with the public for home use, since when the screen is not used its visual impact in a home can be unpleasant, and in any case could impose restrictions on the furnishing.

However, the winding screen solution also is—not without defects, because it requires the positioning of the box-shaped winding structure; this structure, indeed, is of substantial size and therefore has a certain visual impact. The positioning on the ceiling only slightly mitigates this visual impact.

Only with built-in assembly of the box-shaped winding structure, the visual impact of the screen is significantly seduced when it is not used. However, it is clear that such assembly is complex and requires masonry work of significant cost and causing great disturbance in an inhabited home.

The problem at the basis of the present invention is to make a winding projection screen that has a minimal visual impact and that does not require masonry work for its installation.

Consequently, the present invention concerns a screen according to claim 1. Preferred characteristics are indicated in the dependent claims.

In particular, the invention concerns a winding projection screen, comprising a support structure, a winding roller, a. projection sheet wound on said roller, characterised in that the support structure comprises a top horizontal support plane and a vertical engagement face for projecting engagement at a wall.

In this way, the support structure of the winding screen becomes a furnishing element itself; it can for example be shaped like a shelf, or else be used as the bottom part of a hanging cabinet.

Preferably, the support structure is box-shaped and comprises an internal space, in which the winding roller is rotatably mounted, and an opening for the passage of the projection sheet. Thus configured, the support structure completely hides the winding roller from view.

Preferably, the screen comprises a grip rod firmly attached to an edge of the projection sheet that is distal with respect to the winding roller, in which the grip rod and the passage opening are shaped and sized so that the grip rod rests upon the passage opening outside of the support structure, when the projection sheet is completely wound up.

In the case of manual winding, in which a return spring is provided to wind the sheet on the roller, the grip rod is used both to provide a holding point to grip the sheet in order to unwind it, in contrast to the action of the return spring, and to provide a limit abutment for winding up. On the other hand, in the case of motorised winding, in which an electric motor is provided to bias the roller in the direction to wind or unwind the sheet on the roller, the grip rod is used to provide a limit abutment for winding up.

Preferably, the passage opening extends along the support structure at a side thereof opposite the vertical engagement face. This positioning, practically at the end of the support structure, can allow a configuration of the furnishing element such as to hide the presence of a projection sheet as well as possible.

Even more preferably, the grip rod has a longitudinal extension equal to the overall longitudinal extension of the support structure. This configuration further improves the possibility of hiding the presence of a projection sheet.

Preferably, the top horizontal support plane extends over the entire support structure. The support structure is therefore shaped like a shelf, fixed to the wall.

Preferably, the vertical engagement face comprises means for attachment to the wall, similarly to a normal shelf.

Further areas of applicability of the present invention will become apparent from the detailed description provided hereinafter. It should be understood that the detailed description and specific examples, while indicating the preferred embodiment of the invention, are intended for purposes of illustration only and are not intended to limit the scope of the invention.

BRIEF DESCRIPTION OF THE DRAWINGS

The present invention will become more fully understood from the detailed description and the accompanying drawings, wherein: Further characteristics and advantages of a winding projection screen according to the invention shall become clearer from the following detailed description of an embodiment thereof, made with reference to the attached drawings. In such drawings.

DETAILED DESCRIPTION OF THE PREFERRED EMBODIMENTS

Figure 1:
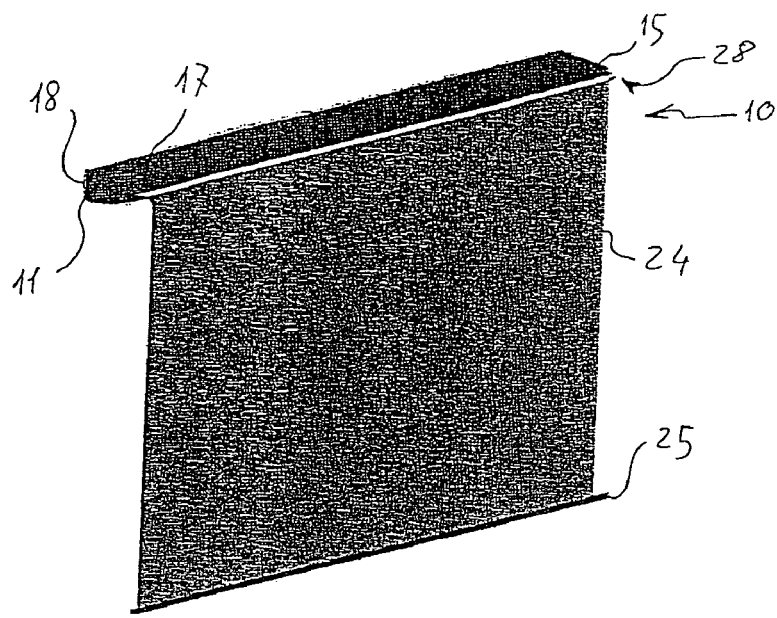
FIG. 1 is a perspective view of a screen according to the invention, with the projection sheet in unwound position.
Figure 2:
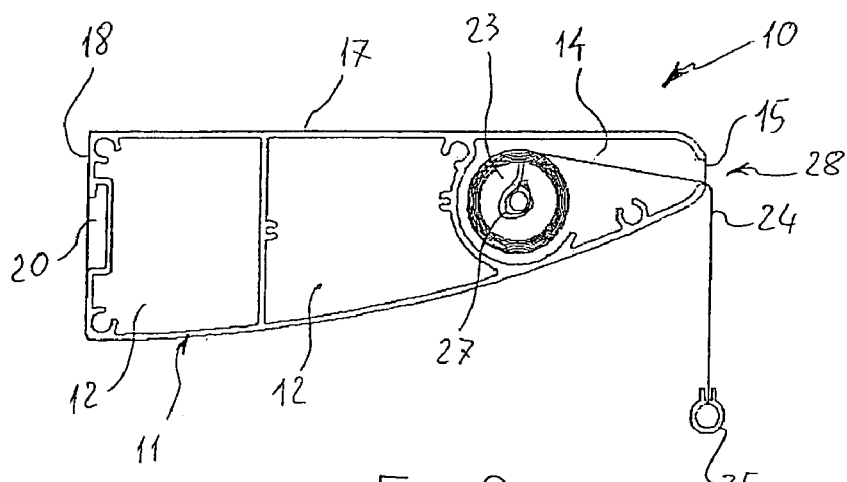
FIG. 2 is a section view of the winding projection screen of FIG. 1, with the sheet in partially unwound position.
Figure 3:
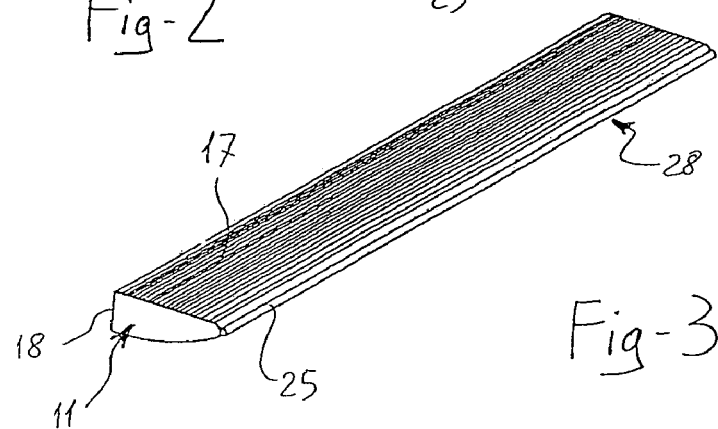
FIG. 3 is a perspective view of the winding projection screen of FIG. 1, with the projection sheet in completely wound-up position.

The following description of the preferred embodiment(s) is merely exemplary in nature and is in no way intended to limit the invention, its application, or uses.

A winding projection screen 10 comprises a box-shaped support structure 11, for example made from extruded metal, In the structure 11, blind internal spaces 12 and an internal space 14 provided with an opening 15, longitudinal with respect to the structure 11, are formed. The structure 11 is shaped like a shelf, and is provided with a top horizontal support plane 17 and with a vertical engagement face 18, for projecting engagement at a wall.

Both the horizontal plane 17 and the vertical engagement face 18 extend for the entire structure 11. In the illustrated screen 10, the horizontal plane 17 is completely free, but it is obviously possible for it to be provided with transversal vertical elements such as dividers or bookends or longitudinal vertical elements such as front or rear retention edges. The vertical engagement face 18 is provided with wall attachment means, like for example a fastening seat 20 shaped to couple with a hook or a fastening bracket (not illustrated) to be fixed to the wall.

A roller 23 on which a projection sheet 24 is wound, provided with a grip rod 25 firmly fixed to an edge of the sheet 24 that is distal with respect to the roller 23, is rotatably housed in the internal space 14. The roller 23 is provided with conventional means for the rotation and therefore for the winding of the sheet, for example a return spring 27, only schematically indicated in the figures; moreover, it is possible to provide for electrical actuation of the roller 23, by means of an electric motor housed in the structure 11.

The projection sheet 24 comes out from the internal space 14 passing through the opening 15, so that the grip rod 25 is outside of the space 14 and rests upon the opening 15 outside of the support structure 11, when the projection sheet 24 is completely wound up.

The structure 11 clearly must have a greater longitudinal extension than the projection sheet 24, to allow the sheet 24 to be housed in the structure 11. The structure 11 can therefore have a longitudinal extension slightly longer than the sheet 24, or else even much longer than it. In particular, whereas the longitudinal extension of the sheet 24 can be selected based upon the video-projection requirements, the longitudinal extension of the structure 11 can be selected based upon other furnishing requirements.

In the case in which the structure 11 extends much more longitudinally than the sheet 24, the opening 15 can extend just slightly more than the sheet 24, enough to allow it to pass, or else even for the entire structure 11. In any case, it is preferable for the grip rod 25 to extend longitudinally as much as the structure 11, so as to hide from view the fact that the structure 11 contains the projection sheet 24; of course, in this case the grip rod 25 shall be shaped so as to take into account the actual longitudinal extension of the opening 15 against which it has to rest when the projection sheet 24 is wound up.

In a variant, not illustrated, the structure 11 around the opening 15 can be provided with an abutment seat for receiving the grip rod 25 and the rod and the seat can be shaped so that the rod remains completely enclosed in the seat, within the shape of the structure 11, when the projection sheet 24 is completely wound up. In this case, possibly, it may be useful to apply an extractor, such as a handle, a knob or a tab, to the rod.

The position of the opening 15 for the passage of the projection sheet 24 on the structure 11 can be either at the bottom, opposite the top horizontal support plane 17, or at the front, on a side 28 opposite the vertical engagement face 18.

The second solution is preferred, both because it allows the grip rod 25 to be better integrated from the aesthetic point of view, which—when the projection sheet 24 is wound up W forms a sort of raised front edge of the structure 11, and because it allows the rod 15 itself to be gripped more easily.

It should also be noted that the winding projection screen 10 according to the invention will need a projection sheet surface 24 normally lower than a conventional winding projection screen to be mounted at the ceiling. Indeed, in most rooms the projection area is not adjacent to the ceiling, but is significantly lower. Whereas with a conventional winding projection screen the projection sheet must necessarily reach as far as the ceiling, with the winding projection screen 10 according to the invention the projection sheet 24 can be sized exactly according to the projection requirements, therefore without wasting an unused portion of projection sheet.

Of course, variants and modifications can be made to the winding projection screen 10 according to the invention, without departing from the scope of protection defined by the following claims. For example, the structure 11, instead of being shaped like a shelf, can be shaped so as to be used as a base of a hanging cabinet.

As various modifications could be made to the exemplary embodiments, as described above with reference to the corresponding illustrations, without departing from the scope of the invention, it is intended that all matter contained in the foregoing description and shown in the accompanying drawings shall be interpreted as illustrative rather than limiting. Thus, the breadth and scope of the present invention should not be limited by any of the above-described exemplary embodiments, but should be defined only in accordance with the following claims appended hereto and their equivalents.

What is claimed is:

1. A winding projection screen, comprising a support structure, a winding roller, a projection sheet wound on said roller, characterized in that the support structure comprises a top horizontal support plane and a vertical engagement face for projecting engagement at a wall, wherein said top horizontal support plane comprises a shelf and wherein a passage opening extends along the support structure at a front thereof, on a side opposite the vertical engagement face.

2. The winding projection screen according to claim 1, wherein the support structure is box-shaped and comprises an internal space, in which the winding roller is rotatably mounted, an for the passage of the projection sheet through said opening.

3. The winding projection screen according to claim 2, comprising a grip rod firmly attached to an edge of the projection sheet that is distal with respect to the winding roller, in wherein the grip rod and the passage opening are shaped and sized so that the grip rod rests upon the passage opening outside of the support structure, when the projection sheet is completely wound up.

4. The winding projection screen according to claim 3, wherein the grip rod has a longitudinal extension equal to the overall longitudinal extension of the support structure.

5. The winding projection screen according to claim 3, wherein the structure around the opening is provided with an abutment seat for receiving the grip rod and the rod and the seat are shaped so that the rod remains completely enclosed in the seat, within the shape of the structure, when the projection sheet is completely wound up.

6. The winding projection screen according to claim 1, wherein the top horizontal support plane extends over the entire support structure.

7. The winding projection screen according to claim 1, wherein the vertical engagement face comprises means for attachment to the wall.

8. The winding projection screen of claim 1 wherein said support structure extends in a longitudinal direction a distance substantially greater than the width of the projection screen.

9. The winding projection screen of claim 8 further comprising a grip rod, said grip rod being substantially the same length as the support structure and substantially longer than the winding screen.

10. The winding projection screen of claim 1 further comprising a grip rod and an abutment seat for receiving said grip rod wherein said grip rod when in said abutment seat forms a raised front edge of said support structure.

11. The winding projection screen of claim 1 further comprising transverse vertical elements on said top horizontal support plane, said transverse vertical elements comprising dividers.

12. The winding projection screen of claim 1 further comprising longitudinal vertical elements along said top horizontal support plane.

13. A winding projection screen, comprising a support structure, a winding roller, a projection sheet wound on said roller, characterized in that the support structure comprises a top horizontal support plane and a vertical engagement face for projecting engagement at a wall, and wherein a passage opening extends along the support structure at a front thereof, on a side opposite the vertical engagement face and wherein said winding projection screen forms a bottom portion of a cabinet.

14. The winding projection screen according to claim 13, wherein the support structure is box-shaped and comprises an internal space, in which the winding roller is rotatably mounted for the passage of the projection sheet through the opening.

15. The winding projection screen according to claim 13, comprising a grip rod firmly attached to an edge of the projection sheet that is distal with respect to the winding roller, in wherein the grip rod and the passage opening are shaped and sized so that the grip rod rests upon the passage opening outside of the support structure, when the projection sheet is completely wound up.

16. The winding projection screen according to claim 15, wherein the grip rod has a longitudinal extension equal to the overall longitudinal extension of the support structure.

17. The winding projection screen according to claim 15, wherein the structure around the opening is provided with an abutment seat for receiving the grip rod and the rod and the seat are shaped so that the rod remains completely enclosed in the seat, within the shape of the structure, when the projection sheet is completely wound up.

18. The winding projection screen according to claim 13, wherein the top horizontal support plane extends over the entire support structure.

19. The winding projection screen of claim 13 wherein said support structure extends in a longitudinal direction a distance substantially greater than the width of the projection screen.

20. The winding projection screen of claim 19 further comprising a grip rod, said grip rod being substantially the same length as the support structure and substantially longer than the winding screen.

21. The winding projection screen of claim 13 further comprising a grip rod and an abutment seat for receiving said grip rod wherein said grip rod when in said abutment seat forms a raised front edge of said support structure.

* * * * *